United States Patent [19]

Loacano

[11] Patent Number: 4,726,202
[45] Date of Patent: Feb. 23, 1988

[54] FLUID LINE LOCK ASSEMBLY

[76] Inventor: Joseph P. Loacano, 29555 Kings Pointe Ct., Farmington Hills, Mich. 48018

[21] Appl. No.: 523,451

[22] Filed: Aug. 15, 1983

[51] Int. Cl.[4] .............................................. E05B 65/12
[52] U.S. Cl. ......................................... 70/242; 70/178
[58] Field of Search ................ 70/242, 243, 244, 422, 70/175–180; 137/354, 383, 384.2, 384.4, 384 C, 384 B, 385; 251/309, 310, 311; 123/198 B

[56] References Cited

U.S. PATENT DOCUMENTS

| | | | |
|---|---|---|---|
| 3,751,948 | 8/1973 | Klein | 70/55 |
| 4,131,127 | 12/1978 | Ferro | 137/384 C |
| 4,217,925 | 8/1980 | Clark | 137/385 |
| 4,262,505 | 4/1981 | Moscalelli | 70/358 |

Primary Examiner—Robert L. Wolfe
Attorney, Agent, or Firm—Stephen Krefman

[57] ABSTRACT

A lock assembly and a fluid or fuel line lock assembly resisting theft. The lock assembly includes a housing with a chamber an aperture for a key, and a cutaway. An inner member, preferably frusto-conically shaped, is inserted in the chamber from a direction opposite the key aperture and is secured therein, for example, by a cover member threaded into the end of the chamber opposite the key aperture. The fuel line lock uses the lock assembly and provides housing breakaway, fuel shut-off, line crimping, and air drawing features to frustrate a potential thief of the motor vehicle using the fuel line lock assembly of the present invention.

41 Claims, 14 Drawing Figures

U.S. Patent  Feb. 23, 1988  Sheet 1 of 4  4,726,202
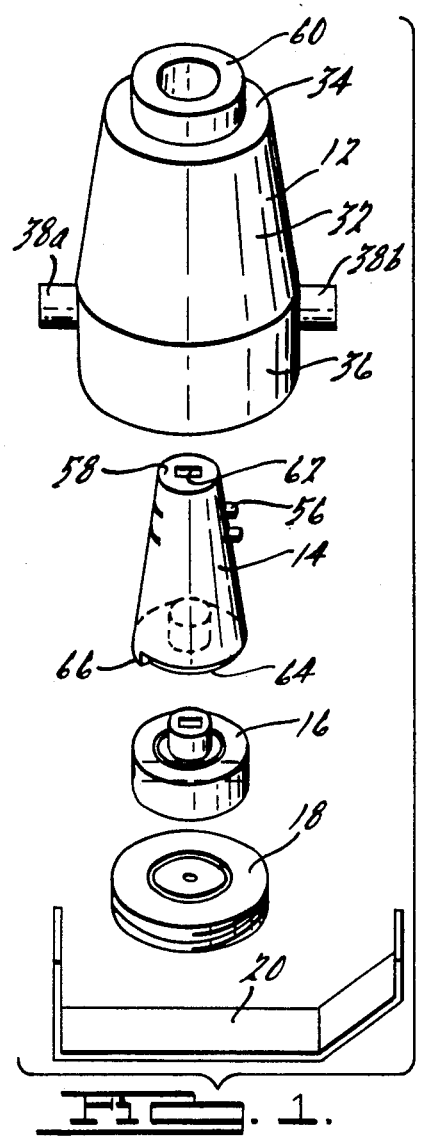
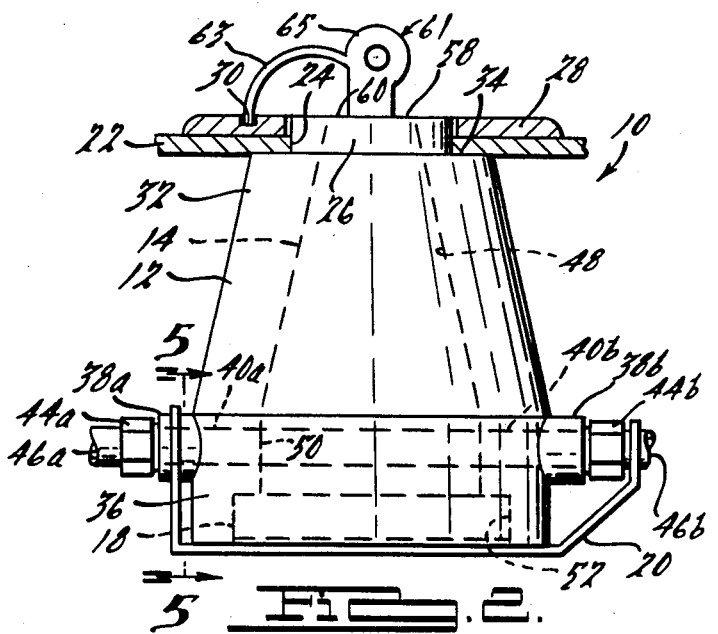
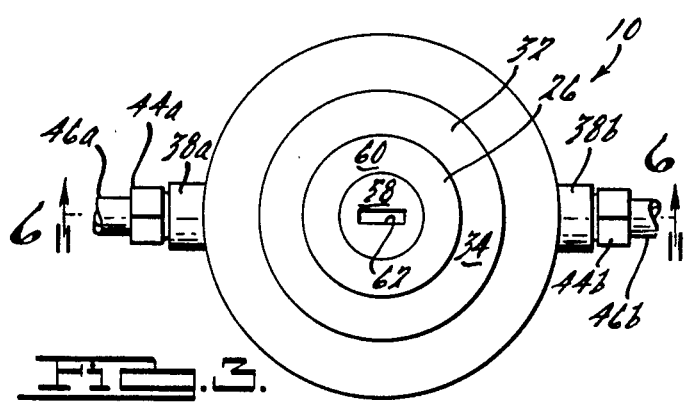
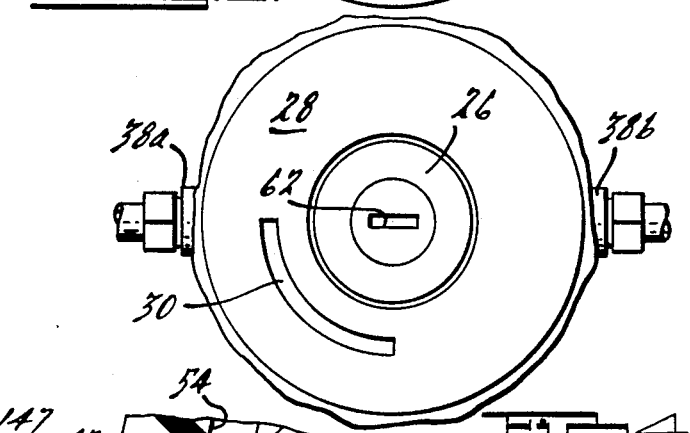
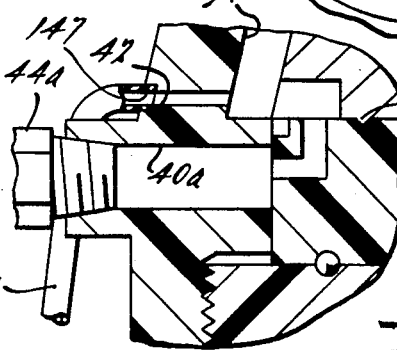

FLUID LINE LOCK ASSEMBLY

BACKGROUND OF THE INVENTION

The present invention relates to locking mechanisms and more particularly to a novel locking mechanism for selectively preventing the flow of fuel from a motor vehicle tank to the motor vehicle engine and also to a novel tumbler assembly for application to various types of locks.

In recent years, theft has become an overwhelming concern of nearly everyone. One particular type of theft which has become epidemic in occurrence is auto theft. This condition particularly exists because of so-called "chop shop" activities wherein a stolen vehicle is quickly disassembled into unrecognizable components which may easily be marketed at a substantial price. It has been estimated that approximately one-third of all motorized vehicles which are stolen eventually wind up in "chop shops". The professional thief is of course the greatest contributor to this type of theft.

A second cause of such thefts is the attitude on the part of some potential thieves that auto theft is easy to accomplish and therefore, even when no pecuniary gain is made as a result of the theft, a "joy ride" may ensue. The "joy ride" type theft accounts for the remaining two-thirds of all thefts. The greatest portion of these types of thefts may be attributed to individuals who repeatedly steal and then damage motor vehicles and other properties. A relatively small portion of this two thirds is committed by professional criminals.

Many devices have been devised in the past in an effort to prevent such vehicle theft. However, repeat offenders, or those who associate with repeat offenders, are well aware of the manner in which such devices are constructed and often can defeat such devices so rapidly as to make these devices little more than a nuisance to the potential thief.

Accordingly, what is needed is an anti-theft device which will prevent the uneducated or unsophisticated thief from stealing a motor vehicle and will create such an inconvenience to a skilled and experienced thief in stealing the vehicle that such experienced thieves will be discouraged from choosing a vehicle having the anti-theft device installed.

Many anti-theft devices, including alarm systems, electronic locks and fuel line locks have been suggested in the past but each previously offered device is either to easy to defeat or prohibitively expensive to install.

For example, there are a few highly sophisticated electronic computerized systems available to the public. However, these devices are prohibitively expensive for use in any vehicle except the most expensive collector vehicles and luxury vehicles.

On the other hand, various fuel line locks have been proposed in the past which provide various amounts of inconvenience to the potential thief. Examples of such fuel line locks are disclosed in Clark, U.S. Pat. No. 4,217,925, Fontana, U.S. Pat. No. 3,792,712, Landi, U.S. Pat. No. 3,773,139, Finazzo, U.S. Pat. No. 2,881,789, Wicker, U.S. Pat. No. 1,374,621, Deadmond, U.S. Pat. No. 1,311,863 and Fuchs, U.S. Pat. No. 1,303,878. These devices are of various complexity and of various strength. However, each of these devices may be defeated relatively rapidly by a experienced car thief once he is aware of the construction of the lock.

For example, Clark provides for a locking mechanism including a rectangular housing and a tumbler assembly threaded downwardly into a threaded bore therein. A thief need only unthread the tumbler from the rectangular body and insert a screwdriver into the aperture where the tumbler previously resided to rotate the valve member into an operational position. The insertion of a cork or a thumb into the aperture to reduce the amount of air drawn into the fuel line completes the operation, and the vehicle may be driven away.

What is needed, therefore, is an anti-theft device designed with a new approach in mind. Although it is virtually impossible to provide a device which is completely tamper proof and which will prevent a determined thief having an unlimited amount of time from stealing a motor vehicle, what is needed instead is a device which will not be easily defeated with common auto theft tools and which will frustrate a potential thief by requiring an unacceptable amount of time and effort to defeat the lock. Furthermore, such an anti-theft device should inhibit theft by isolating, as much as possible, the tumbler and valve components from the interior of the motor vehicle, where they are most easily tampered with.

SUMMARY OF THE PRESENT INVENTION

The present invention provides a novel solution to the above described problem by providing a tamper resistance fuel line lock assembly.

The present invention provides a lock having a housing with a longitudinal axis, a chamber formed in the housing, preferably of a frustoconical shape, aperture means extending axially from the chamber, and cutaway means formed in the housing extending from the chamber and preferably consisting of at least one axially extending slot. An inner member, also preferably frustoconically shaped, is fitted in the housing and secured therein by securing means such as a cover. Key aperture means are formed axially in the small end of the inner member such that a preselected key may be inserted through the aperture means into the key aperture means. Lock means are provided within the inner member and are selectively reciprocable in a known manner into and out of the cutaway means in response to the rotation of the preselected key.

The present invention further provides a fluid line locking assembly using the above described lock assembly and further providing a valve body fitted in the chamber between the inner member and the securing means. Passageways are provided transversely across the housing and the valve body and are selectively engageable to form a passageway for fluid in a preselected orientation of the valve body. The valve body is selectively rotated by the preselected key means.

In the preferred embodiment of the present invention, the fluid line lock assembly is used as a fuel line lock assembly for selectively permitting fuel to flow from a fuel tank of a motor vehicle to the internal combustion engine of the vehicle. The fuel line lock assembly is mounted below the floor of the vehicle and only a small portion of the assembly extends through an aperture in the floor. Various breakaway, fuel shut-off, line crimping, and air drawing features are provided to frustrate the potential theft of the motor vehicle. Each of these features prevent the passage of fuel from the fuel tank to the internal combustion engine when the fuel line lock assembly is tampered with using any conventional tool other than a preselected key.

In particular, the breakaway feature consists of a weakened cross-section in a portion of the housing. Upon exertion of a predetermined force on the inner member or on the housing, the housing breaks so as to drop the bottom portion of the valve assembly, and therefore the valve member, out of reach of the potential thief.

The line crimping feature consists of a bracket extending between a portion of the fuel line and the housing such that, upon the breakage of the housing as described above, the bracket pivots and crimps the fuel line to prevent the passage of fuel.

The fuel shut-off feature may consist of a secondary valve member depending from the valve member and selectively inserted along the passageway so as to prohibit the flow of fuel along the first passageway even after the above described breakage of the housing.

The air drawing feature consists of a special passageway provided through the assembly to draw air into the fuel line to prevent the theft of the vehicle in the event that the inner member is forced to rotate relative to the valve member.

The line crimping, fuel shut-off and air drawing features each limit the driving range for the vehicle once the cevice has been tampered with.

Thus, a primary object of the present invention is to provide a fuel lock assembly inhibiting theft. The present invention achieves this object by providing an inner member having a frusto-conical shape or similar shape such as to defeat attempts of a thief to draw the tumbler assembly through the housing.

Another object of the present invention is to provide a fuel line lock assembly to frustrate theft of the motor vehicle. This object is accomplished by the present invention by providing a frusto-conically shaped tumbler and housing and further by providing the housing breakaway, fuel shut-off, line crimping and air drawing features described above.

Still another object of the present invention is to provide a general purpose locking assembly having a construction that inhibits theft by preventing a thief from pulling the tumbler assembly through the housing in the direction of the key. This object is accomplished by use of a frusto-conically shaped tumbler having the opening to the key slot disposed at the small diameter end thereof.

These and many other objects, features and advantages of the present invention will be apparent to those skilled in the art when the following detailed description of the preferred embodiment is read in conjunction with the drawings appended hereto.

BRIEF DESCRIPTION OF THE DRAWINGS

In the drawings appended hereto:

FIG. 1 is an exploded perspective view of an example of structure of a fuel line lock assembly according to the present invention;

FIG. 2 is a partial cutaway view of the fuel line lock assembly of FIG. 1 installed in the floor of a motor vehicle;

FIG. 3 is a top view of the fuel line lock assembly of FIG. 1;

FIG. 4 is a top view of the fuel line lock assembly of FIG. 1 installed in the floor of a motor vehicle;

FIG. 5 is a sectional view taken along lines 5—5 of FIG. 2;

FIG. 7 is a partial sectional view similar to FIG. 6 but illustrating a modification thereto;

DETAILED DESCRIPTION OF THE PREFERRED EMBODIMENT

Figure 6:
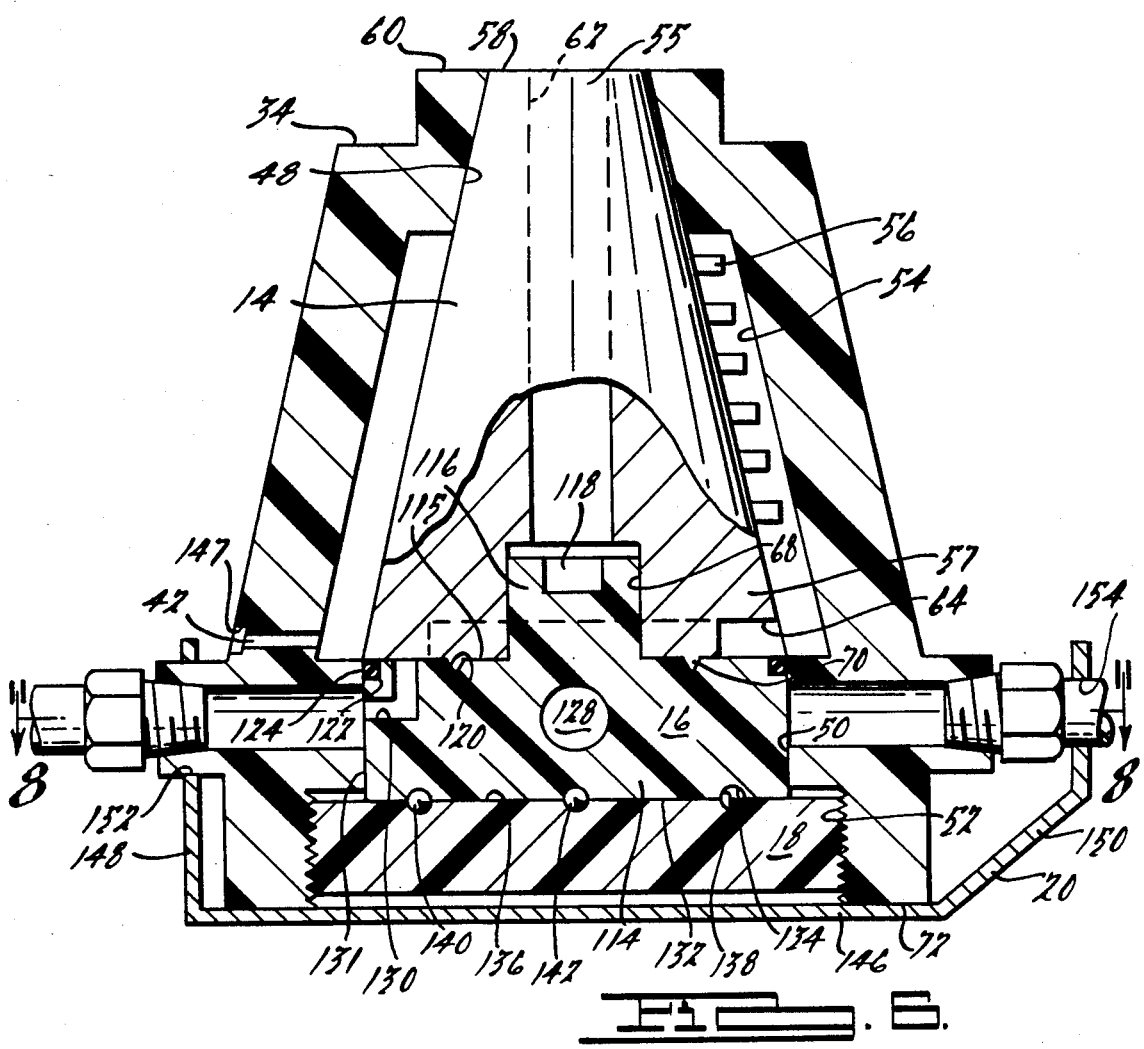
FIG. 6 is a sectional view taken along lines 6—6 of FIG. 3.

Referring now to the drawings, and more particularly to FIGS. 1 through 7 thereof, a first example of structure for a fuel line lock assembly 10 of the present invention is illustrated. It will be appreciated by those skilled in the art that the specific examples of structure illustrated in the drawings are offered for illustrative purposes only and are not offered by way of limitation, as many modifications and variations may be made within the spirit of the present invention.

The fuel line lock assembly 10, as best shown in FIG. 1, includes an outer frusto-conical member or housing 12, an inner frusto-conical member or cylinder 14, a valve member 16, a cover member 18, and a shut-off plate 20. Each of these elements and their interrelationship will be described in detail below.

Referring now to FIG. 2 wherein the details of the outer frusto-conical member 12 of the fuel line lock assembly 10 are illustrated. The outer frusto-conical member 12 is mounted to a vehicle floor 22 of a motor vehicle and has a cylindrical upper protion 26 passed through an aperture 24 in the floor. An annular plate 28 having a partial annular slot 30 may be mounted to the floor within the vehicle to ornamentally complete the internally visible portion of the fuel line lock assembly 10. It should be noted that, as illustrated, the annular plate 28 may be secured to the floor by any convenient means. Preferably, the annular plate 28 is not secured to the cylindrical upper portion 26 of the frusto-conical member 12.

Below the vehicle floor 22, the outer frusto-conical member 12 has a generally frusto-conical upper portion 32. An annular shoulder 34 is formed between the frusto-conical portion 32 and the cylindrical upper portion 26 and abuts the lower surface of the vehicle floor 22. The outer frusto-conical member 12 further has a cylindrical lower portion 36 and oppositely disposed radial bosses 38a and 38b extending from the cylindrical lower portion. Apertures 40a and 40b are formed in each of the radial bosses 38a and 38b and cooperate to form a first transverse bore through the outer frusto-conical member 12. Fittings 44a and 44b are provided at the ends of the radial bosses 38a and 38b, respectively, for interconnection thereto of fuel line portions 46a and 46b to the internal combustion engine and to the fuel tank of the vehicle.

The outer frusto-conical member 12 is further provided with an internal passageway including a frusto-conical passage 48 within the frusto-conical portion 32 and a cylindrical passage 50 within the cylindrical lower portion 36 thereof. A threaded counterbore 52 is also provided in the lower most end of the outer frusto-conical member 12. Axially extending slots 54 are formed in the frusto-conical passage 48 of the outer frusto-conical member 12. Finally, a small diameter aperture 42 is formed between the outer surface of the outer frusto-conical member 12 and the inner surface thereof or, as illustrated through one of the slots 54 therein.

Referring now to FIG. 6, the inner frusto-conical member 14 is fitted into the frusto-conical passage 48 of the outer frusto-conical member 12. The inner frusto-conical member 14 includes a tumbler assembly, not shown in the drawing, but well known in the art, having a plurality of pins 56 extending therefrom. The tumbler assembly differs only from conventional tumbler assemblies in that the pins are of the different sizes, becoming progressively longer from the small end 55 to the large end 57 of the inner frusto-conical member 14.

The inner frusto-conical member 14 is fitted into the outer frusto-conical member 12 in such a manner that the upper surface 58 of the inner frusto-conical surface is substantially coplanar with the upper surface of the outer frusto-conical member 12 for ornamental purposes. A key slot 62 is formed in the center of the inner frusto-conical member 14, in a manner well known in the art, such that a preselected key may be inserted therein to cooperate with the tumbler assembly to selectively retract the pins 56, thereby permitting rotation of the inner frusto-conical member when the proper key is used. The inner frusto-conical member 14 is further provided with a partial annular groove 64 and a partial central bore 68 at the lower end 57 thereof.

The valve member 16 is fitted below the inner frusto-conical member 14 into the cylindrical passage 50 in the outer frusto-conical member 12. The valve member 16 has a main cylindrical portion 114 and a smaller cylindrical portion 116 extending upwardly therefrom into the central bore 68 of the inner frusto-conical member. A small slot 118 is provided in the top of the small cylindrical portion 116 for insertion therein of the end of the key. Thus, when the proper key is used so as to permit rotation of the inner frusto-conical member 14, the end of the key rotates the valve member 16.

A shoulder 115 is formed between the cylindrical portions 114 and 116 and is provided with an annular slot 120 which cooperates with an annular protrusion 70 extending downwardly from the lower end 57 of the inner frusto-conical member 14. The annular shoulder 115 is further provided with an annular groove 122 fitted with an O-ring 124 to form a seal between the valve member 16 and the outer frusto-conical member 12.

A main central passageway 128 generally consisting of a transverse bore, is provided through the main cylindrical portion 114 of the valve member 16. The main passageway 128 is selectively engageable with the apertures 40a and 40b so as to interconnect the two portions 46a and 46b of the fuel line and to thereby supply the internal combustion engine of the motor vehicle with fuel from the fuel tank thereof.

An L-shaped bleed passageway 130 is also provided between the outer cylindrical surface 131 of the main cylindrical portion 114 and the annular shoulder 115 thereof. The bleed passageway 130 cooperates with the partial annular groove 64 of the inner frusto-conical member 14 and the small aperture 42 of the outer frusto-conical member 12, in a manner to be described later, to introduce air into the line portion 46a in the event of an attempted theft of the motor vehicle.

The cover member 18 consists of an externally threaded disc threaded into the counterbore 52 of the outer frusto-conical member 12 so as to secure the valve member 16 and the inner frusto-conical member 14 in position in the outer frusto-conical member 12. The upper surface 136 of the cover member is provided with an annular slot 138 which cooperates with a similar overlying annular slot 134 in the lower surface 132 of the cover member 18. Bearings 140 are provided between the annular slots 134 and 138 to facilitate rotation of the valve member 16 relative to the cover member 18. An additional single ball bearing 142 may be provided in suitable mating hemispherical cavities in the upper and lower mating surfaces 132 and 136, respectively, as illustrated.

The shut-off plate 20 is mounted to the fuel line lock assembly after the cover member 18 is secured to the outer frusto-conical member 12. The shut-off plate 20 is formed from a single stamping of sheet metal material to form a generally U-shaped member having a base portion 146 resting against the lower surface 72 of the outer frusto-conical member 12 and two arms 148 and 150 extending upwwardly therefrom. Each of the arms 148 and 150 is provided with an aperture 152 and 154, respectively. The radial bosses 38a on the engine side of the fuel line lock assembly are passed through one of the apertures 152 or while the fuel line portion 46b on the fuel tank side of the outer frusto-conical member 12 is passed through the other aperture 154.

The operation of the above described fuel line lock assembly is as follows.

During normal operation, the pins 56 prevent rotation of the valve member 16 except when the proper key is inserted in the key slot 62. When the proper key 61 is used as shown in FIG. 2, a tang 63 extending from the head 65 of the key may be selectively inserted into the guide slot 30 of the annular plate 28 so as to guide the proper motion of the key between the fully locked position, illustrated in FIG. 6, and a position ninety degrees therefrom wherein the transverse bore 128 is aligned with the apertures 40a and 40b to permit passage of fuel therealong.

The frusto-conical shape of the inner frusto-conical member 14 prevents potential thieves from disassembling and disabling the fuel line lock assembly 10 by pulling the inner frusto-conical member 14 upwardly through the outer frusto-conical member. Furthermore, the annular shoulder 34 and the frusto-conical shape of the outer frusto-conical member 12 prevents pulling of the entire assembly upwardly through the aperture 24 in the vehicle floor. Thus, one major method used in the past to disable such a device is unavailable.

Similarly, if a potential thief attempts to force a screwdriver down the key slot 62, only a small amount of force will be withstood before the outer frusto-conical member 12 will tilt and crimp the fuel line. If an effort is made to rotate the screwdriver, the pins 56 will interfere. If an attempt is made to rotate the inner frusto-conical member with a screwdriver until the pins yield or break, only the inner frusto-conical member 12 will be rotated, due to the reduced size of the slot 118. Thus, this attempt at stealing the vehicle will fail since the annular groove 64 will become aligned with the passageways 122 and 42, resulting in an undesirable entry of air into the fuel line. Thus, these alternate conventional methods for defeating a fuel line lock assembly are no longer available to the potential thief of the motor vehicle having a fuel line lock assembly 10 of the present invention.

An optional outlet line 145 is illustrated in FIG. 7 as fitted into a counterbore 147 in the outer frusto-conical member coaxial with the bore 42. The outlet line 145 receives any fuel which may travel from the internal combustion engine of the fuel line lock assembly to the passage 42 and directs the fuel downardly so as to safely drain from the vehicle.

Figure 8:
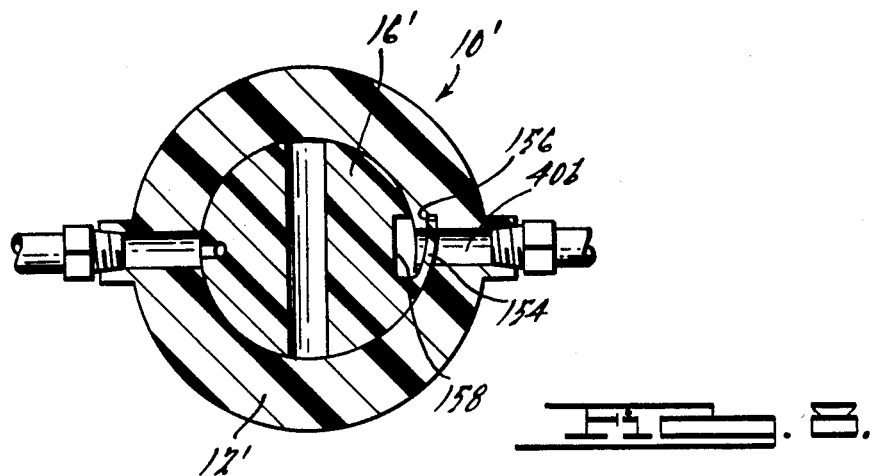
FIG. 8 is a sectional view taken along lines 8—8 of FIG. 6 and illustrating a modification to the fuel line lock assembly of FIG. 1.

An alternate example of structure for a fuel line lock assembly 10' is shown in FIG. 8. In the fuel line lock assembly 10', the valve member 16' is provided with a small secondary valve member 154 formed integrally therewith selectively insertable in a slot 156 in the outer frusto-conical member 12' so as to block the aperture 40b when the fuel line lock assembly 10' is in the inoperative position. The secondary valve member 154 and the valve member 16' are formed of a resilient material and the secondary valve member is deflectable into another cavity 158 in the valve member 16' when the valve member 16' is rotated away from the inoperative position. The secondary valve member 154 therefore prevents inadvertent leakage of fuel after the fuel line apparatus of the present invention has been tampered with.

Figure 13:
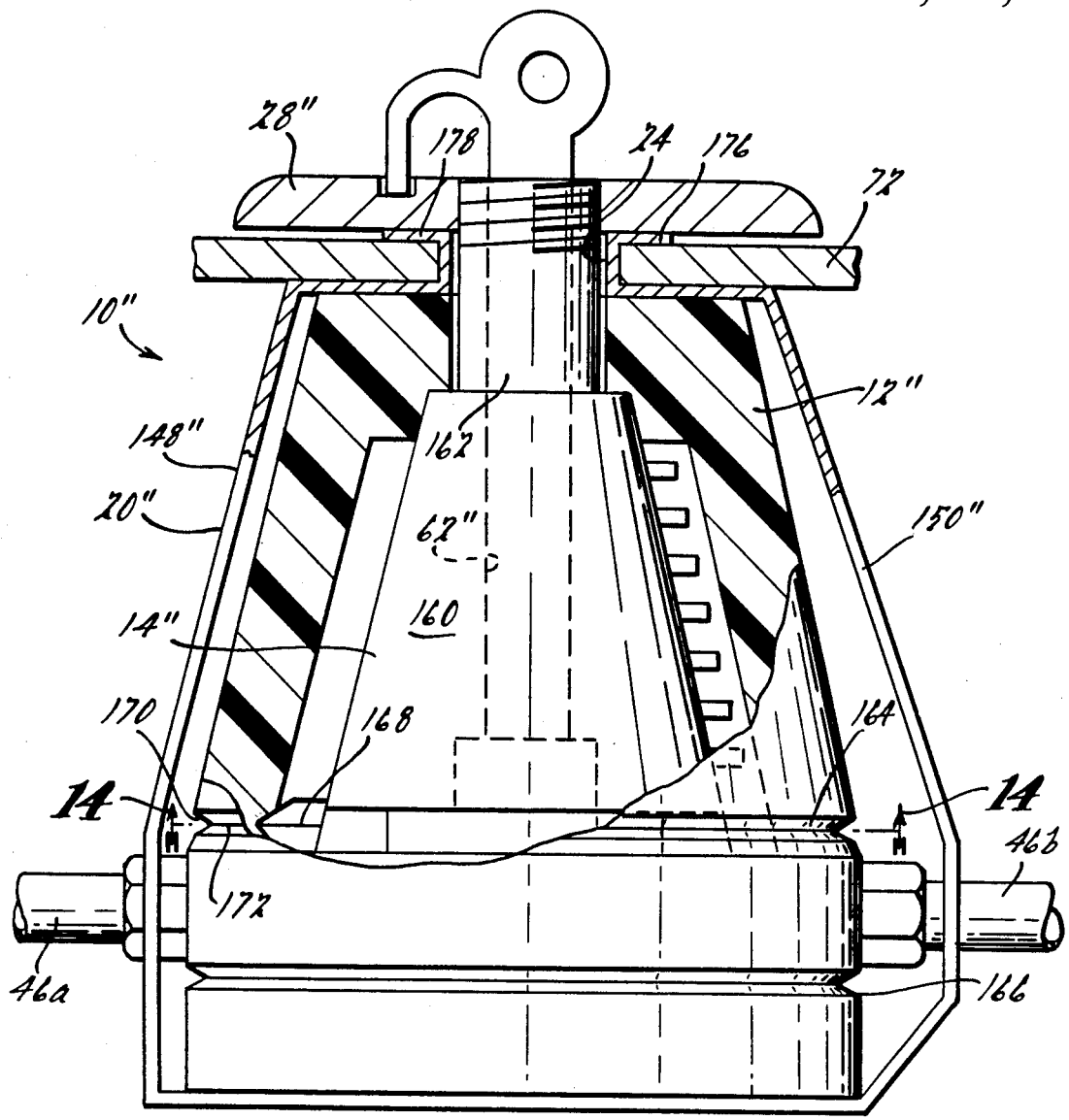
FIG. 13 is a partly cutaway view of an alternate example of structure for a fuel line lock assembly of the present invention.
Figure 14:
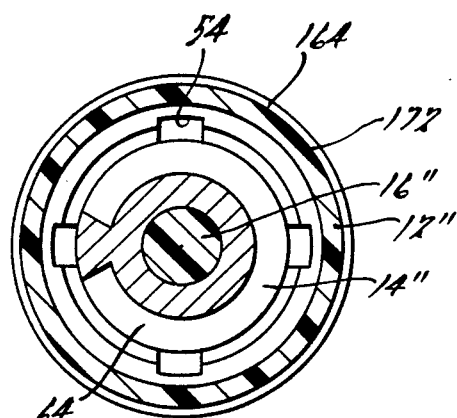
FIG. 14 is a sectional view taken along lines 14—14 of FIG. 13.

Still another example of structure of a fuel line lock assembly 10" is illustrated in FIGS. 13 and 14 of the present invention. In this example of structure, the inner frusto-conical member 14" has a frusto-conical portion 160 and a cylindrical portion 162 extending upwardly therefrom. The outer frusto-conical member 12" is completely below the vehicle floor 22 while the cylindrical portion 162 of the inner frusto-conical member 14" extends upwardly through the aperture 24 and is secured therebehind by a threaded plate 28". The outer frusto-conical member 12" is further provided with one or more weakened portions 164 and 166 formed by, for example, inner and outer annular channels 168 and 170 cooperating to produce a thin web of material 172 therebetween.

The weakened portions are provided so that, in the event of an attempted theft, an attempt to disable the device by inserting a screwdriver in the key slot 62" with a downward force would result in breakage of the outer frusto-conical member 12" along the weakened portions 164 and/or 166, thus preventing rotation of the valve member 16" to the operative position to permit the flow of fuel.

Furthermore, in the fuel line lock assembly 10" of FIG. 13, the shut-off plate 20" is further provided with elongated arms 148" and 150" extending upwardly around the outer frusto-conical member through the aperture 24 in the vehicle floor 22. The ends 176 and 178 of the elongated arms are squeezed between the plate 28" and the vehicle floor 22. The shut-off plate 20" therefore cooperates with the plate 28" the outer frusto-conical member 12" in position yet still provides for a crimping action on the fuel line 46b in the event that a downward impact force, in excess of a predetermined amount, is experienced by the fuel line lock assembly 10".

It should be noted that the secondary valve member 154 may be used in conjunction with the breakaway feature of FIGS. 13 and 14 advantageously, particularly if the lower portion 166 is designed to break before the upper portion 164. When the lower portion 166 breaks, the inner frusto-conical member 14", the valve member 16" and the cover member 18" (not shown) will move downwardly relative to the upper portion of the outer frusto-conical member 12", thus shearing off the secondary valve member 154 and leaving it in position to prevent leakage of fuel. If necessary, the lower portion 57 of the inner frusto-conical member 14 may be provided with a cutting edge to facilitate this action.

It will be appreciated by those skilled in the art that various different tumbler assemblies may be used in conjunction with the fuel line lock assembly 10, 10', or 10" of the present invention. For example, as shown in FIGS. 9 through 12, the frusto-conical shape facilitates the novel and theft resistant variations on existing cylinder locks. It will therefore be appreciated by those skilled in the art that the tumbler assemblies or cylinder locks 71' and 73' described below are of general application and may be used for other locking functions, such as for locking entrances of buildings, or for vehicle ignition and entry locks.

It will further be appreciated that the specific tumbler assemblies described are only examples of the various tumblers available in the prior art which may be modified according to the present invention to resist theft.

Figure 9:
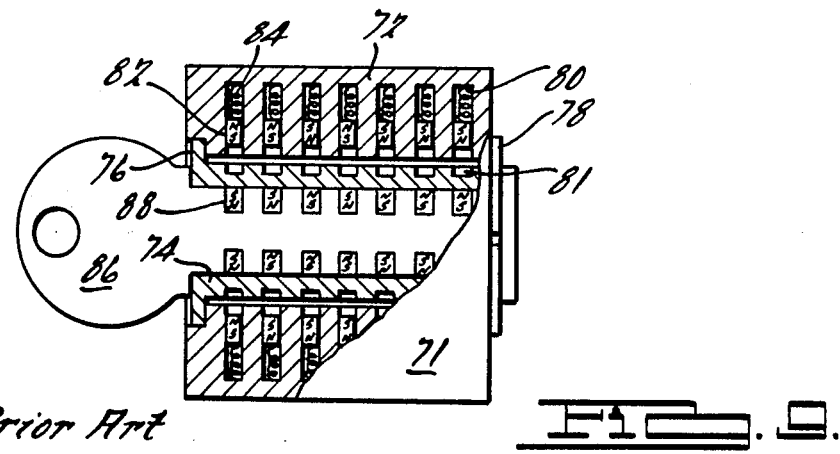
FIG. 9 is a cutaway view of an example of a magnetic tumbler assembly of the prior art.

FIG. 9 illustrates an example of a prior art cylinder lock 71 having an outer cylindrical member 72 and an inner cylindrical member 74. The head portion of the inner cylindrical member 74 is provided with a key slot while the opposite end is secured to the outer member by means of a C-clip 78. Bores 80 and 81 are provided in the inner and outer members, respectively, and are aligned in sets. Magnets 82 are provided in the bores 80 and are biased outwardly by springs 84 into the bores 81. A key 86 is provided with magnets 88 which cooperate with the magnets 82 if the proper key is choosen to magnetically bias the magnets 82 out of the bores 81 so as to permit rotation of the cylinder.

Figure 10:
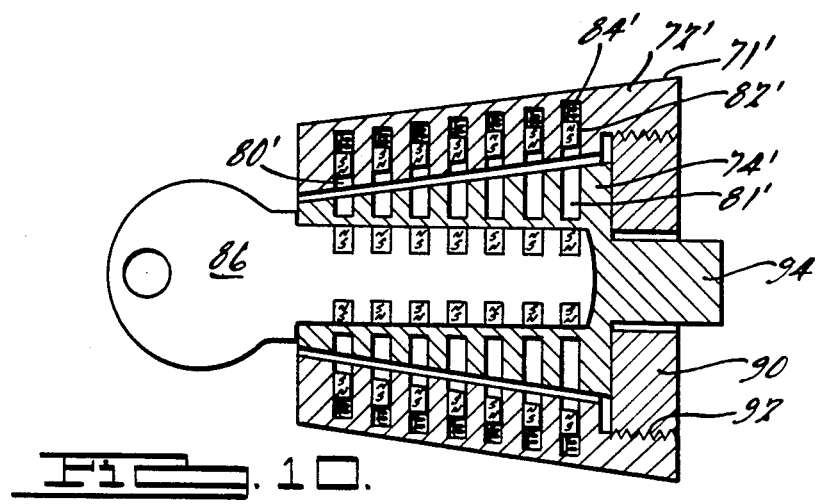
FIG. 10 is a view similar to FIG. 9 of an example of a magnetic tumbler assembly according to the present invention.

A magnetic cylinder lock 71' according to the present invention is illustrated in FIG. 10. An inner frusto-conical member is fitted in a frusto-conical bore in the outer member 72 and is secured therein by a cover 90 threaded into a threaded counterbore 92 located proximate the large end of the frusto-coincal inner member 74. The key 86, which may be identical to the key used in the prior art, is inserted in a key slot disposed diametrically opposite the cover member 90. The inner member 74' may further be provided with a boss 94 extending through the cover member 90, if necessary, to engage any member intended to be driven by the key. Magnets 82' and springs 84' are provided in bores 80' in the outer member while similar aligned bores 81' are provided in the inner frusto-conical member.

It will be appreciated by those skilled in the art that the cylinder lock 71 of FIG. 9 may be easily defeated by hammering a screw into the key slot until it engages the inner member and pulling the screw outwardly, until the C-clip yields, by means of a crowbar or similar pulling tool. Such a method would not apply to the cylinder lock 71' of the present invention illustrated in FIG. 10 since the frusto-conical member may not be pulled toward the user of the key. Instead, any attempt to defeat the cylinder lock 71' would require moving the inner member further inwardly. This would require a tremendous amount of force, since the cover member 90 or the outer member 72' must be broken. Furthermore, additional backing structure resisting such damage to the lock may be provided by elements not shown in the drawing disposed behind the cover member 90 and the outer member 72'.

Figure 11:
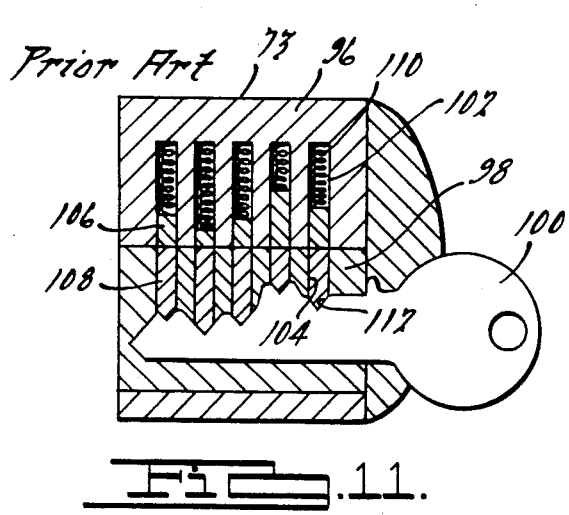
FIG. 11 is a sectional view through a mechanical tumbler assembly of the prior art.
Figure 12:
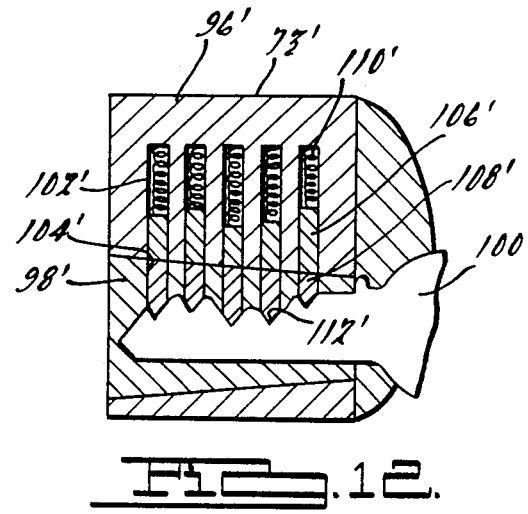
FIG. 12 is a sectional view similar to FIG. 11 illustrating a mechanical tumbler assembly according to the present invention.

Similarly, FIG. 11 illustrates an example of a mechanical cylinder lock 73 of the prior art having a cylindrical outer member 96, a cylindrical inner member 98, and a plurality of bores 102 and 104 in the cylindrical outer member 96 and the cylindrical inner member 98, respectively. Pins 106 and pins 108 are provided in each of the bores 102 and 104 and are biased towards the key 100 by springs 110. When the proper key is used, the key notches 112 will orient the pins 106 and 108 in a proper position such the border between two mating pins 106 and 108 will be aligned with the border between the cylindrical inner member 98 and the cylindrical outer member 96 thus permitting rotation of the key and cylinder.

A mechanical cylinder lock 73' according to the present invention similar to the mechanical cylinder lock 73 replaces the cylindrical inner member 98 with an inner frusto-conical member 98' fitted in a frusto-conical bore in an outer member 96'. The key 100 may be identical to the key used by the cylinder lock 73. Similarly, the bores 102' and 104' and the pins 106' and 108', as well as the springs 110', may be similar to those used before. Only the depth of the bore or the particular cooperating shapes of the pins 106 and 108 need be modified so as to cooperate with the proper key 100 to permit rotation of the inner frusto-conical member 98'.

The above described frusto-conical lock assemblies may be used for various purposes other than fuel line lock assemblies. However, each of the above described cylinder locks 71' and 73' may be incorporated into any of the three above described fuel line lock assemblies 10, 10', and 10", advantageously. It will be appreciated by those skilled in the art that while the present invention has been described with respect to various specific and interrelated features, it is contemplated that devices may be assembled using some or all of the features in various combinations, depending on the need and the needs of a user.

Furthermore, the above description is offered by way of example and constitutes the best mode contemplated by the inventor at the time of filing the present application for carrying out the present invention. Many modifications and variations may be made from the structure described above without departing from the spirit of the present invention. Such modifications and variations are included within the intended scope of the claims appended hereto.

What is claimed as novel is as follows:

1. A lock assembly comprising:
   a housing having a longitudinal axis;
   a frusto-conical chamber formed in said housing and extending along said longitudinal axis, said frusto-conical chamber having a large end and a small end;
   aperture means in said housing extending axially from said small end of said frusto-conical chamber to the exterior of said housing;
   an axially extending slot in said housing adjacent said frusto-conical chamber;
   a frusto-conical inner member fitted within said housing, said frusto-conical inner member having a large end and a small end;
   key aperture means formed axially in said small end of said frusto-conical inner member;
   lock means disposed partially within said frusto-conical inner member and selectively reciprocable therefrom into and out of said slot in response to a preselected key means inserted through said aperture means into said key aperture means and rotated therein; and
   securing means securing said frusto-conical inner member in said frusto-conical chamber.

2. The lock assembly of claim 1 wherein said aperture means comprises a portion of said frusto-conical chamber.

3. The lock assembly of claim 1 wherein said lock means comprises magnetic lock means such that said preselected key means comprises a magnetic key.

4. The lock assembly of claim 1 wherein said lock means comprises mechanical tumbler means.

5. The lock assembly of claim 1 wherein:
   said housing further comprises internal thread means formed in said housing adjacent said large end of said frusto-conical chamber; and
   said securing means comprises cover means having external thread means selectively engageable with said internal thread means.

6. The lock assembly of claim 5 further comprising aperture means in said cover means such that said frusto-conical inner member may communicate therethrough with articles being locked by said lock assembly.

7. A fluid line lock assembly comprising:
   a housing having a longitudinal axis;
   a chamber formed in said housing and extending along said longitudinal axis, said chamber having a circular cross section and having one end and an other end;
   internal thread means formed in said housing adjacent said other end of said chamber;
   aperture means in said housing extending axially from said one end of said chamber to the exterior of said housing;
   cutaway means formed in said housing extending from said chamber;
   an inner member having a circular cross section and fitted into said chamber, said inner member having one end ajacent said aperture means and an other end opposite said one end;
   key aperture means formed in said one end of said inner member;
   lock mean disposed partially within said inner member and selectively reciprocable therefrom into and out of said cutaway means in response to insertion of preselected key means into said aperture and rotation of said preselected key means therein;
   a valve member fitted in said chamber adjacent said other end of said lock means, said valve member being rotatably driven by said key aperture means;
   first passageway means formed in said housing;
   second passageway means formed in said valve member and selectively engageable with said first passageway means in a preselected angular position of said valve member; and
   securing means adajcent said valve means and securing said valve body and said inner member within said chamber: said securing means further comprising cover means having external thread means selectively engageable with said internal thread means of said housing.

8. A fluid line lock assembly comprising:
   a housing having a lngitudinal axis;

a chamber formed in said housing and extending along said longitudinal axis, said chamber having a circular cross section and having one end and an other end;

aperture means in said housing extending axially from said one end of said chamber to the exterior of said housing;

cutaway means formed in said housing extending from said chamber;

an inner member having a circular cross section and fitted into said chamber, said inner member having one end adjacent said aperture means and an other end opposite said one end; wherein said inner member increases in diameter from said one end towards said other end, and further wherein said chamber has a portion shaped similarly to said inner member;

key aperture means formed in said one end of said inner member;

lock means disposed partially within said inner member and selectively reciprocable therefrom into and out of said cutaway means in response to insertion of preselected key means into said aperture and rotation of said preselected key means therein;

a valve member fitted in said chamber adjacent said other end of said lock means, said valve member being rotatably driven by said key aperture means;

first passageway means formed in said housing;

second passageway means formed in said valve member and selectively engageable with said first passageway means in a preselected angular position of said valve member; and securing means adjacent said valve means and securing said valve body and said inner member within said chamber.

9. The fluid line lock assembly of claim 8 wherein said inner member is frusto-conically shaped.

10. The fluid line lock assembly of claim 8 wherein said inner member has a frusto-conical portion adjacent said other end, a reduced diameter cylindrical portion adjacent said one end, and a shoulder interpose said frusto-conical portion and said cylinder portion.

11. The fluid line lock assembly of claim 8 wherein said aperture means comprises a portion of said chamber.

12. The fluid line lock assembly of claim 7 wherein said cutaway means comprises at least one axially extending slot formed in said housing.

13. The fluid line lock assembly of claim 8 wherein:
said housing further comprises internal thread means formed in said housing adjacent said other end of said chamber; and
said securing means comprises cover means having external thread means selectively engageable with said internal thread means.

14. The fluid line lock assembly of claim 7 further comprising aperture means in said securing means such that said inner member may selectively communicate therethrough with apparati being locked by said lock assembly.

15. The fluid line lock assembly of claim 7 wherein:
said second passageway means comprises a first transverse bore in said valve member; and
said first passageway means comprises a second transverse bore selectively aligned with said first transverse bore in said preselected angular position.

16. The fluid line lock assembly of claim 7 wherein:
said valve member comprises a first disc rotatably provided in said chamber;
said securing means comprises a second disc having said external thread formed on the periphery thereof.

17. The fluid line lock assembly of claim 16 further comprising bearing means interposed said first and second discs.

18. A fuel line lock assembly for selectively shutting off the supply of fuel from a fuel tank to an internal combustion engine of a motor vehicle and for installation adjacent a first aperture in a structure of said motor vehicle, said fuel line lock assembly comprising:
a housing having a longitudinal axis;
a chamber formed in said housing and extending along said longitudinal axis, said chamber having a circular cross section and having a small end;
a second aperture in said housing extending axially from said small end of said chamber to the exterior of said housing;
cutaway means formed in said housing extending from said chamber;
an inner member having a circular cross section and fitted into said chamber, said inner member having one end adjacent said second aperture and an other end opposite said one end;
a portion of said fuel line lock assembly being adapted for extending through said first aperture;
key aperture means formed in said one end of said inner member;
lock means dispostod partially within said inner member and selectively reciprocable therefrom into and out of said cutaway means in response to insertion of preselected key means into said first aperture and rotation of said preselected key means therein;
a valve member fitted in said chamber adjacent said lock means, said valve member being rotatably driven by said key aperture means;
first passageway means formed in said housing;
second passageway means formed in said valve member and selectively engageable with said first passageway means in a preselected angular position of said valve member; and
securing means adjacent said valve means and securing said valve body and said inner member within said chamber;
third passageway means in said inner member and said housing and extending from said valve member to the ambient atmosphere in a preselected position of said inner member relative to said valve member, such that upon forced rotation of said inner member without rotation of said valve member, air is introduced into said fuel line.

19. The fuel line lock assembly of claim 18 wherein said inner member has a frusto-conical portion and wherein said chamber has a portion having the same shape as said inner member.

20. The fuel line lock assembly of claim 19 wherein said inner member extends through said first and second apertures.

21. The fuel line lock assembly of claim 18 wherein said housing further comprises projection means adapted for insertion through said first aperture in said structure of said motor vehicle and a shoulder means formed in said housing adjacent said projection means, said shoulder means cooperating with said structure of said motor vehicle to prevent passage of said housing through said first aperture when said fuel line lock assembly is interconnected with said motor vehicle.

22. The fuel line lock assembly of claim 18 wherein:
said housing further comprises internal thread means formed in said housing adjacent said other end of said chamber; and
said securing means comprises cover means having external thread means selectively engageable with said internal thread means.

23. The fuel line lock assembly of claim 18 further comprising aperture means in said securing means such that said inner member may selectively communicate therethrough with apparati being locked by said lock assembly.

24. The fuel line lock assembly of claim 18 wherein:
said second passageway means comprises a first transverse bore in said valve member; and
said first passageway means comprises a second transverse bore selectively aligned with said first transverse bore in said preselected angular position.

25. The fuel line lock assembly of claim 18 wherein:
said valve member comprises a first disc rotatably provided in said chamber;
said securing means comprises a second disc having an external thread; and
said housing comprises internal thread means formed in said housing adjacent said other end of said chamber, said securing means being threadably engaged therewith.

26. A fuel line lock assembly for selectively shutting off the supply of fuel from a fuel tank to a internal combustion engine of a motor vehicle and for installation below a first aperture in a structure of said motor vehicle, said fuel line lock assembly comprising:
a housing having a longitudinal axis;
a chamber formed in said housing and extending along said longitudinal axis, said chamber having a circular cross section and having a small end;
a second aperture in said housing extending axially from said small end of said chamber to the exterior of said housing;
cutaway means formed in said housing extending from said chamber;
an inner member having a circular cross section and fitted into said chamber, said inner member having one end adjacent said second aperture and an other end opposite said one end;
a portion of said fuel line lock assembly being adapted for extending through said first aperture;
key aperture means formed in said one end of said inner member;
lock means disposted partially within said inner member and selectively reciprocable therefrom into and out of said cutaway means in response to insertion of preselected key means into said first aperture and rotation of said preselected key means therein;
a valve member fitted in said chamber adjacent said lock means, said valve member being rotatably driven by said key aperture means;
first passageway means formed in said housing;
second passageway means formed in said valve member and selectively engageable with said first passageway means in a preselected angular position of said valve member; and
securing means adjacent said valve means and securing said valve body and said inner member within said chamber; said fuel line lock assembly further comprising a weakened cross section on said housing disposed between said securing means and said chamber such that, upon exertion of a predeptermined force on said inner member through said first and second apertures, said housing breaks along said weakened cross section and prevents fuel from passing along said first and second passageway means.

27. The fuel line lock assembly of claim 26 further comprising bracket means interposed said fuel line and said housing such that upon breakage of said housing at said weakened cross section and upon exertion of a second predetermined amount of force on said inner member through said first and second apertures, said bracket crimps said fuel line, preventing passage of fuel therethrough.

28. The fuel line lock assembly of claim 26 further comprising third passageway means in said inner member and said housing and extending from said valve member to the ambient atmosphere in a preselected position of said inner member relative to said valve member, such that, upon forced rotation of said inner member without rotation of said valve member, air is introduced into said fuel line.

29. The fuel line lock assembly of claim 18 wherein said third passageway comprises a partial annular chamber in said other end of said inner member and a radial passage in said housing.

30. The fuel line lock assembly of claim 18 further comprising:
plate means mounted to said floor over said aperture;
a second aperture in said plate overlying said first mentioned aperture; and
slot means on said plate means adjacent said aperture, said slot means cooperating with said preselected key to guide the proper rotation of said preselected key and, thereby, to assure rotation of said valve member to said preselected position.

31. The fuel line lock assembly of claim 18 further comprising fuel shut-off means selectively operable to close said first passageway means when said valve member is in said second preselected position.

32. A fuel line lock assembly for selectively shutting off the supply of fuel from a fuel tank to a motor vehicle along a fuel line to the internal combustion engine of said motor vehicle and for installation below a first aperture in the floor of said motor vehicle, said fuel line lock assembly comprising:
a housing mounted below said floor and having a longitudinal axis and an abutment portion abutting the portion of said floor around said first aperture with said longitudinal axis disposed normal to said floor;
a main passageway formed in said housing and extending along said longitudinal axis;
a frusto-conical portion of said main passageway having a small upper end and a large lower end;
an axially extending slot formed in said housing adjacent said frusto-conical portion;
a frusto-conical inner member fitted into said frusto-conical portion of said chamber;
key aperture means formed axially in said small end of said frusto-conical inner member;
lock means disposed partially within said frusto-conical inner member and selectively reciprocable therefrom into and out of said slot in response to a preselected key means inserted through said first aperture into said key aperture means and rotated therein;

a valve member fitted in said passageway adjacent said large end of said frusto-conical inner member, said valve member being rotatably driven by the end of said preselected key;

a first transverse bore extending through said housing across said main passageway, a portion of said fuel line leading to said fuel tank being interconnected with one end of said first transverse bore and a portion of said fuel line leading to said internal combustion engine being interconnected with the other end of said first transverse bore;

a second transverse bore extending through said valve member and selectively engageable with said first transverse bore in a first predetermined angular position of said valve member to permit flow of fuel from said fuel tank to said internal combustion engine;

internal thread means formed in said housing adjacent the lower end of said main passageway; and cover means having an external thread means engageable with said internal thread means to secure said valve member and said frusto-conical inner member to said housing.

33. The fuel line lock assembly of claim 32 wherein:
said valve member comprises a first disc rotatably provided in said chamber;
said securing means comprises a second disc having an external thread; and
said housing comprises internal thread means formed in said housing adjacent said other end of said chamber, said securing means being threadably engaged therewith.

34. The fuel line lock assembly of claim 32 further comprising a weakened cross section on said housing disposed between said securing means and said chamber such that, upon exertion of a predetermined force on said inner member through said first aperture said housing breaks along said weakened cross section and prevents fuel from passing along said first and second passageway means.

35. The fuel line lock assembly of claim 32 further comprising:
plate means mounted to said floor over said aperture;
a second aperture in said plate overlying said first mentioned aperture; and slot means on said plate means adjacent said aperture, said slot means cooperating with said preselected key to guide the proper rotation of said preselected key and, thereby, to assure rotation of said valve member to said preselected position.

36. The fuel line lock assembly of claim 32 further comprising fuel shut-off means selectively operable to close said first passageway means when said valve member is in said second preselected position.

37. The fluid line lock assembly of claim 8 wherein said cutaway means comprises at least one axially extending slot formed in said housing.

38. The fluid line lock assembly of claim 8 further comprising aperture means in said securing means such that said inner member may selectively communicate therethrough with apparati being locked by said lock assembly.

39. The fluid line lock assembly of claim 8 wherein:
said valve member comprises a first disc rotatably provided in said chamber;
said securing means comprises a second disc having a external thread; and
said housing comprises internal thread means formed in said housing adjacent said other end of said chamber, said securing means benin threadably engaged therewith.

40. The fuel line lock assembly of claim 26 wherein said housing further comprises projection means adapted for insertion through said first aperture in said structure of said motor vehicle and a shoulder means formed in said housing adjacent said projection means, said shoulder means cooperating with said structure of said motor vehicle to prevent passage of said housing through said first aperture when said fuel line lock assembly is interconnected with said motor vehicle.

41. The fuel line lock assembly of claim 26 wherein:
said valve member comprises a first disc rotatably provided in said chamber;
said securing means comprises a second disc having an external thread; and
said housing comprises internal thread means formed in said housing adjacent said other end of said chamber, said securing means benin threadably engaged therewith.

* * * * *